United States Patent
Benedetti

(10) Patent No.: US 10,624,371 B2
(45) Date of Patent: Apr. 21, 2020

(54) APPARATUS FOR DISPENSING AND MIXING COLD BEVERAGES

(71) Applicant: UNITEC S.P.A., Lugo (IT)

(72) Inventor: Luca Benedetti, Savarna (IT)

(73) Assignee: UNITEC S.P.A., Lugo (RA) (IT)

( * ) Notice: Subject to any disclaimer, the term of this patent is extended or adjusted under 35 U.S.C. 154(b) by 18 days.

(21) Appl. No.: 15/539,543

(22) PCT Filed: Dec. 22, 2015

(86) PCT No.: PCT/IB2015/059885
§ 371 (c)(1),
(2) Date: Jun. 23, 2017

(87) PCT Pub. No.: WO2016/108148
PCT Pub. Date: Jul. 7, 2016

(65) Prior Publication Data
US 2017/0347690 A1 Dec. 7, 2017

(30) Foreign Application Priority Data
Dec. 30, 2014 (IT) .............................. PN2014A0068

(51) Int. Cl.
*B67D 3/00* (2006.01)
*B67D 1/00* (2006.01)
(Continued)

(52) U.S. Cl.
CPC .................. *A23L 2/52* (2013.01); *A23L 2/00* (2013.01); *B67D 1/0021* (2013.01);
(Continued)

(58) Field of Classification Search
CPC ............ A23L 2/52; A23L 2/00; B67D 1/0021; B67D 1/0037; B67D 1/0857;
(Continued)

(56) References Cited

U.S. PATENT DOCUMENTS 2,765,234 A * 10/1956 Schmitt ...................... A23L 2/02
366/150.1
3,290,788 A * 12/1966 Seelandt ..................... A23C 1/08
159/4.09
(Continued)

FOREIGN PATENT DOCUMENTS

WO    WO 2006/017893 A1    2/2006
WO    WO 2012/030312 A1    3/2012

*Primary Examiner* — Ana M Vazquez
(74) *Attorney, Agent, or Firm* — Birch, Stewart, Kolasch & Birch, LLP

(57) ABSTRACT apparatus for dispensing mixed beverages obtained by mixing fresh vegetable products that were previously cut into small pieces, ground and frozen before being inserted into the apparatus and kept frozen until they are ready to be used. This apparatus comprises a beverage pickup compartment accessible from outside, a plurality of distinct and separate containers suitable to contain a specific quantity of frozen product, and to selectively distribute a definite quantity of the product contained therein in a mixing station, in which said containers are associated with a respective collecting means to containers toward a respective path that includes said mixing station and a thawing station; the latter is suitable to be positioned either upstream or downstream of said station.

12 Claims, 3 Drawing Sheets

(51) Int. Cl.
  *A47J 31/40* (2006.01)
  *A23L 2/52* (2006.01)
  *B67D 1/08* (2006.01)
  *A23L 2/00* (2006.01)

(52) U.S. Cl.
  CPC ......... *B67D 1/0037* (2013.01); *B67D 1/0857* (2013.01); *B67D 1/0895* (2013.01); *B67D 3/0009* (2013.01); *B67D 3/0019* (2013.01); *B67D 3/0022* (2013.01); *A47J 31/40* (2013.01); *B67D 3/0041* (2013.01)

(58) Field of Classification Search
  CPC .. B67D 1/0895; B67D 3/0009; B67D 3/0019; B67D 3/0022; B67D 3/0041; A47J 31/40
  See application file for complete search history.

(56) References Cited

U.S. PATENT DOCUMENTS

| | | | |
|---|---|---|---|
| 4,194,650 A | 3/1980 | Nottke et al. | |
| 6,460,734 B1 * | 10/2002 | Schroeder | B67D 1/0021 222/129.1 |
| 6,745,592 B1 * | 6/2004 | Edrington | A23G 9/045 426/524 |
| 2003/0039728 A1 * | 2/2003 | Herrick | A23C 9/133 426/249 |
| 2008/0041876 A1 * | 2/2008 | Frank | A23G 9/045 222/1 |
| 2014/0209634 A1 | 7/2014 | Metropulos et al. | |

\* cited by examiner

APPARATUS FOR DISPENSING AND MIXING COLD BEVERAGES

DESCRIPTION

The present invention refers to an automatic apparatus for preparing and dispensing a plurality of beverages selected by a consumer, and in which the individual components of the selected drink are previously frozen.

In prior art and in common usage are known some types of such vending machines, or "dispensers", as they will be called herein below, that are designed to prepare a beverage whose content is obtained by mixing a plurality of different components contained separately inside the dispenser; when the user of these types of machines selects a particular beverage that is not immediately available in the dispenser, but that can be obtained through a suitable mixing of some components contained in the same dispenser, the user gives the machine a set of instructions or commands, based on which the machine, operating in a completely automatic mode, selects and draws the necessary doses of the different components of the requested beverage from the respective containers, mixes said closes with each other, and presents the resulting final beverage to the consumer.

These types of dispenser machines are for example described in WO 2009/032942 A2 and US 2006/0043111.

Often, these beverages are also required to be suitably chilled; for this purpose, various methods are known, ranging from the solution of maintaining the different containers in refrigerated condition to the solution of chilling the ready-mixed beverage.

For example, EP 0 716 042 A1 discloses the method of cooling, by means of a prior-art cooling plant, a beverage container from which are drawn, on request, the desired quantities of beverage; however, this solution does not offer the possibility of obtaining a particular drink made on request by mixing the base components.

EP 0 343 488 B1 discloses a type of dispenser made so as to provide a beverage obtained from squeezing a type of chosen fruit; in order to preserve the freshness of the fruit stored in the dispenser as long as possible, the container in which said fruit is kept before it is used is maintained at a low temperature, but not such as to risk freezing the fruit, so that it can be immediately cut and pressed.

This solution has however some evident limits; first of all, it is not possible to mix at will the various beverages obtained from pressing, so that the use becomes fairly similar to a simple automation of the operations that any operator in a bar must carry out to offer a simple fruit juice; moreover, said machine is considerably complex and critical from the point of view of its maintenance and guarantee of cleanliness, as it includes some functional devices that must work directly on the fruit, such as fruit slicing means, and means for pressing and crushing the fruit.

WO 2012/030312 A1 discloses a type of dispenser suitable to supply cold beverages obtained from the processing of separate frozen components shaped in the form of cylinders. Said components are formed by the freezing of parts of different kinds of blended or ground fruit, or fruit syrups, etc., that are prepared beforehand; after being prepared in the liquid state or at any rate in the state of fresh product, such substances are frozen separately and shaped at the same time in the form of respective cylinders of frozen product.

Said cylinders of frozen product are then inserted and closed inside respective suitable refrigerated compartments contained in the dispenser, ready to be used.

When the user requests a beverage obtainable from a specific mixing of different products in respective quantities, he or she enters a specific instruction into the dispenser, which actuates an operation that separates relative portions of product from the respective cylinders of frozen product.

This operation consists of approaching said cylinders to a lower blade, and of rotating them against said blade to allow the blade to cut and separate the desired portions of the different products.

This solution presents some evident problems; first of all, it requires the presence of rotational mechanisms, actuators, blades, and associated control and operating devices such that the complexity and thus the cost of such a dispenser becomes immediately unacceptable in a field characterized by extreme competitiveness.

In addition, the preliminary phase of freezing the various types of products formed in the shape of cylinders and their installation inside the dispenser requires some operations that are delicate from the hygienic point of view and also rather laborious, if it becomes necessary to install a certain number of frozen cylinders in suitable holders that must be opened and properly closed, possibly without touching the frozen products with the hands.

WO 2008/097088 discloses a type of cold beverage dispenser in which the cooling action is achieved by blowing into the drinks already poured in a normal serving container, such as a glass, a jet of a liquid that when it is released into the atmosphere changes from a liquid to a gaseous state and extremely lowers its temperature, thus also lowering the temperature of the drink struck by such jet of gas; for example, the liquid employed is liquid nitrogen.

However, this type of dispenser does not offer the possibility of selectively mixing the various ingredients contained separately in the dispenser, and in addition it will be evident that the necessity of periodically replacing the container of liquid nitrogen or equivalent liquid becomes particularly burdensome and also hazardous from the point of view of safety.

In conclusion, the types of distributors or dispensers mentioned above show obvious and unavoidable intrinsic limits that do not allow the possibility of selecting a cold drink obtained by mixing basic products consisting of originally fresh fruit in predefined quantities at the request of the end consumer, that are then processed/blended/ground and subsequently frozen to maintain all their initial qualities, in which the resulting mixture is made immediately available, and that are simple, safe, automatic, and suitable to process products so as to ensure the required hygienic characteristics.

It would thus be desirable, and it is the main objective of the present invention, to produce a type of automatic vending machine prearranged for the preparation of beverages obtained from mixing previously frozen portions of compounds of fresh fruit or similar vegetable products, in which the composition of each beverage can be selected as desired with regard to both the type and quantity of the relative ingredients, that is capable of overcoming the restrictions described above.

These portions of previously frozen compounds are mixed with each other and/or with other products, such as coconut milk, water, almond milk, etc.

This purpose is achieved with a dispensing apparatus made and operating according to the enclosed claims.

Characteristics and advantages of the invention will become evident from the description that follows, by way of example and without limitations, with reference to the enclosed figures, in which.

It must be clearly explained that the basic purpose of such dispensing apparatus is to dispense different beverages comprising different mixings of selectively specified products, which products are held in respective containers in the state of frozen and granulated products.

The purpose of keeping products frozen until the moment when they are to be used is to be able to preserve such products, generally of vegetable origin, for a reasonably long time, so that, together with their long preservation it is also possible to guarantee the preservation of their organoleptic properties and most of all their food safety.

In fact, it can be easily imagined that the storage of such products, like syrups, vegetable extracts, fruit parts, etc., in places normally accessed by people and therefore at a rather "warm" temperature would rapidly cause the relative deterioration of their organoleptic properties and food safety.

Moreover, there would not be the certainty that some of these products are absolutely "natural", that is, without additives, preservatives, emulsifying agents, coloring agents, etc., in other words all those substances that, although they are completely legal, effectively modify to some extent the chemical and organoleptic characteristics of the product compared to the corresponding fruit and/or fresh vegetables that are only gathered, cut up and frozen without further processing.

However, to keep these products at a low temperature, and preferably in the state of frozen products, it is necessary that they be inserted into the dispenser as easily separable products that can be divided into single quantities: without having to use complex and costly devices; this requirement is possible only if said products, that are inserted into the apparatus, and are later separated and apportioned, and then also liquefied, are initially prepared as frozen but granulated products, or in a similar form of presentation, and presented as an indistinct mass so that they can be kept at a low temperature but can also, if necessary, be separated from the mass and separated or divided up into specific quantities that can then be processed or treated separately.

In short, the apparatus is designed to process products that are initially introduced as masses of frozen granulate that can be easily processed so as to be separated into individual quantities of substantially frozen but easily processed product, as will be more evident later.

Figure 1:
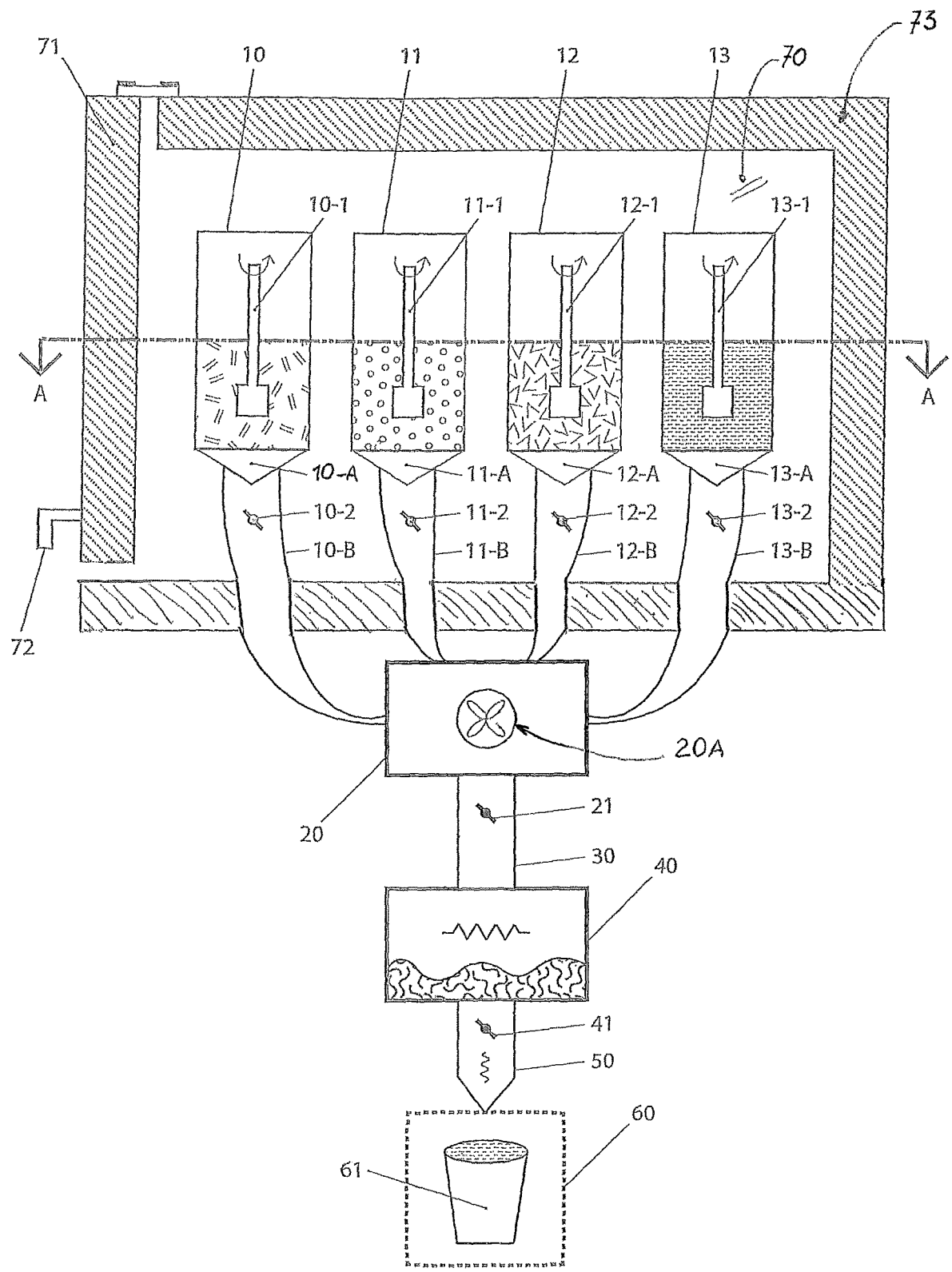
FIG. 1 is a schematic illustration of the composition and of the connections of the main devices of an apparatus according to the invention.
Figure 2:
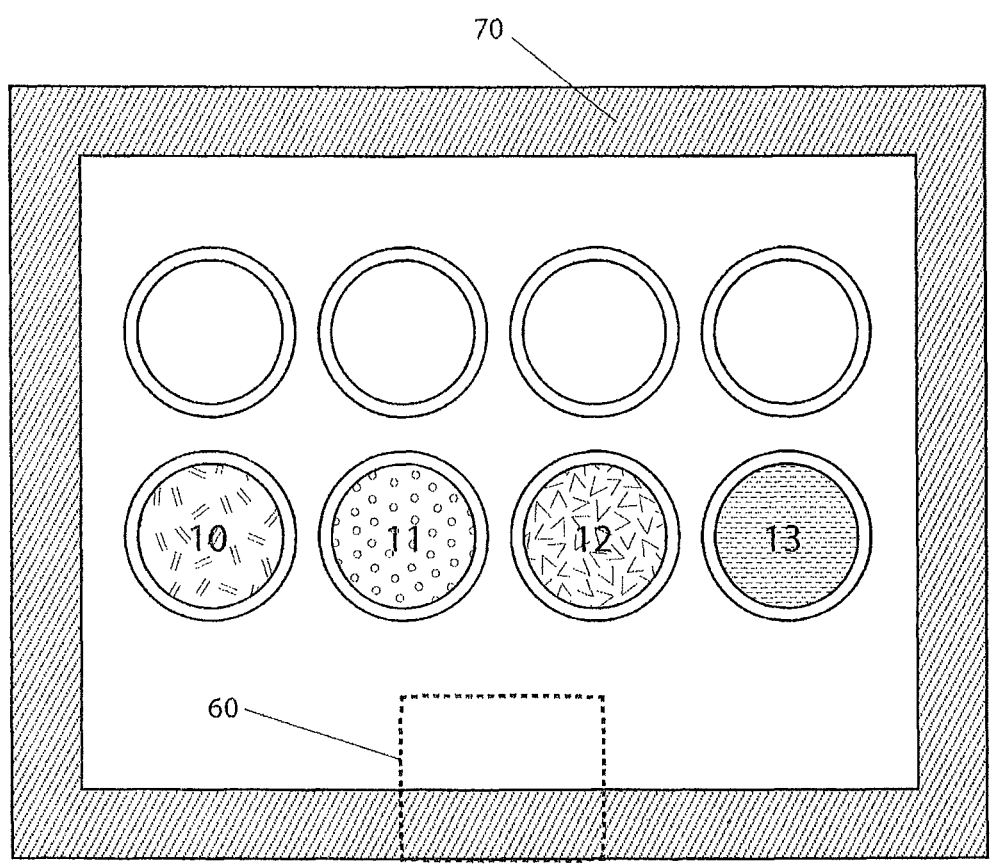
FIG. 2 is a view according to cross section A-A of the device of FIG. 1.

With reference to FIGS. 1 and 2, an apparatus for the preparation of beverages or, in general, mixtures/syrups/blends/centrifuged juices containing or composed essentially of parts of fresh fruit and/or vegetable products, generally comprises, in principle and as minimum equipment:

a plurality of individual and separate containers 10, 11, 12, 13 . . . , each suitable to contain and selectively distribute pre-determined quantities of the products contained in them;

a respective plurality of collecting devices 10-A, 11-A, 12-A, 13-A . . . arranged at the bottom of each of said individual and separate containers 10, 11, 12, 13 and suitable to collect a selectively predetermined quantity of product;

first conveying means 10-B, 11-B, 12-B, 13-B . . . suitable to convey the products from said collecting devices 10-A, 11-A, 12-A, 13-A . . . to at least one mixing device 20;

second conveying means 30 suitable to convey the products from said mixing device 20 to a de-freezing or liquefaction device 40;

first valves 10-2, 11-2, 12-2, 13-2 . . . , arranged in said first conveying means 10-B, 11-B, 12-B, 13-B;

a second valve 21 arranged in said second conveying means 30, suitable to close the passage of the products from said mixer 20 until a moment preset by suitable control means, which will be better specified later;

third conveying means 50 suitable to convey the product, prepared in said de-freezing device 40, to a pickup space or chamber or compartment 60 accessible from outside which is suitable to accommodate a relative container 61, typically a cup or a glass, that the consumer can pick up;

a third valve 41 arranged in said third conveying means 50;

command and control means, not shown, suitable to receive and process the signals entered by the consumer and to transmit suitable operating signals to suitable actuators designed to:

selectively activate one or more of said collecting devices 10-A, 11-A, 12-A, 13A . . . , activate/deactivate said mixing device 20;

selectively activate said de-freezing or liquefaction device 40;

selectively activate a mechanism for inserting said container 61 into said pickup compartment 60;

opening and/or selectively closing said first valves 10-2, 11-2, 12-2, 13-2 . . . and said other valves 21 and 41.

The basic characteristics and the general functionality of the devices described above will now be explained.

It is particularly pointed out that these devices and means are generally known in the art, and that the invention consists essentially of their optimized mechanical integration and most of all in their functional integration so as to make it possible to obtain, and offer for consumption by an undifferentiated public, a type of beverage having completely and substantially new characteristics.

A) The single and separate containers 10, 11, 12, 13 . . . are receptacles of regular shape, preferably vertically extending, so that the product they contain can be easily drawn from below, typically by gravity; their function is to form respective vessels into which to pour the relative products from outside, and in which the same products can be kept, even for extended periods, until they are used. These containers are in turn housed in a single cavity or cooling cell 70 kept at a temperature significantly below 0° C., and preferably around −6° C. or lower; in practice, this cell is made and works in a manner similar to a cell of a home freezer that is kept at a temperature of about −6° C., that is, corresponding to one star (*), or less.

And as with home freezers, the temperature inside said cell is selectively controllable.

The construction and functionality of such a cooling cell 70 is thus well known, and therefore will not be discussed further.

It should also be noted that said cell 70 can be open, so as to allow access to said containers, through a door 71 that can extend either vertically, and thus is mounted on the front surface or on one of the lateral surfaces of the dispenser apparatus, or horizontally and thus is mounted on the ceiling of the apparatus, in a manner in every way similar to freezers of "chest" type.

In general, therefore, said cooling cell 70 is delimited and separated from outside by an insulating wall 73, that is already well known both with regard to materials and to its technological makeup.

Naturally, it is possible to design and build specific and different containers, which can be maintained at a suitable temperature for the refrigerated storage of rice milk, soya milk, water, etc.; such products can be subsequently mixed with other newly thawed products, so as to obtain the desired final beverage.

B) The collecting devices 10-A, 11-A, 12-A, 13-A . . . are devices suitable to collect a selectively predetermined quantity of product contained in said containers 10, 11, 12, 13 and bearing down substantially on the bottom of the same; preferably, said devices comprise a relative hopper, itself known, completed by a relative motion means 10-1, 11-1, 12-1, 13-1 . . . inserted into the relative hopper and suitable to be driven, preferably in a rotating motion, by a respective motor, not shown, The purpose of said moving elements 10-1, 11-1, 12-1, 13-1 . . . is to mix the product in the hopper the moment when they collect it so that the required quantity is released, while preventing it from "sticking" with other parts of surrounding product.

In fact, it must be remembered that the products in said containers are charged in the form of frozen granulates, so that it becomes necessary to separate with actions of mechanical type the parts that must be immediately used for a quantity of product from the rest of the mass of product that remains in the respective container.

The measurement of the required quantity can be carried out by various ways and means, themselves also known, that are not included in the present invention.

In addition, advantageously on the bottom of the collecting devices is arranged a respective first closing valve 10-2, 11-2, 12-2, 13-2 . . . , selectively openable/closable by suitable actuating devices, also known and not shown, suitable to open and/or close the bottom of the respective device, so as to guarantee that when no product is to be collected from a specific container, the respective collecting device is reliably closed.

C) Downstream of said first closing valves are arranged first conveying means which typically are relative vertically extending conduits 10-B, 11-B, 12-B, 13-B . . . that debauch into at least one mixing device 20.

D) Said mixing device 20 is typically a closed cell wherein said conduits 10-B, 11-B, 12-B, 13-B . . . converge and convey the relative products; in said cell is arranged a suitable movable element 20/A, itself already known, suitable to mix said products so as to obtain the desired mixture;

E) From this mixing device 20 departs a second conveying means 30 in which is arranged a second valve 21 suitable to selectively close/open the passage of the newly mixed products from said conduit toward and inside the liquefaction or de-freezing device 40; the purpose of said second valve 20 is to maintain the products within the mixing device 20 until the moment when the desired degree of mixing is obtained; typically and preferably said mixing is achieved with a timed control of the operation of the movable element 20/A, but naturally other modes of controlling the mixing process are possible.

F) Said liquefaction or de-freezing device 40 is essentially a further cavity in which is arranged a heating means, typically an electrical heating element, not shown; the purpose of said device 40 is to heat the formed mixture coming from the mixer 20, so as to thaw or liquefy, at least to a desired extent, the still-frozen parts, so as to make the beverage more appreciated by the consumer.

In short, said apparatus can be easily equipped with command, control and actuating means such as to enable it to supply any desired combination of beverages; for example, it can mix a single product with one or more other accompanying liquid substances, such as rice milk, water, almond milk, etc.; or it can supply various pre-frozen products mixed with each other or even more products mixed with each other but with the addition of one or more other added liquid components, such as for example one of those just mentioned.

G) From said liquefaction or de-freezing device 40 departs a third conduit 50, which debouches into an underlying pick-up compartment 60 in which can be positioned, with known and normally automatic means, a container to be used by the consumer, such as a cup or a glass 61.

H) In said third conduit is arranged a third valve 41 which is selectively actuatable and is opened only after the liquefaction in the preceding liquefaction or de-freezing device 40 has been brought to the desired degree.

I) The apparatus of the invention is also provided with an external control panel through which the consumer enters the data corresponding to the beverage that he or she wishes to have; these data are:

the type of the ingredients that are to be used to compose the chosen beverage;

the quantity of each of said ingredients;

if necessary, the temperature of the final beverage supplied.

The apparatus can also naturally supply beverages having a mixture that is a predefined and known composition, and thus in this case it is not necessary to provide any indication other than the selection of the type of chosen beverage, in a manner completely similar to other types of dispensers.

L) In addition, the apparatus is provided with internal command and control means, not shown, through which are processed the instructions and the signals to send to all the actuators and operating devices of the apparatus, which naturally include all the functional devices described above, and which for concision are not repeated; moreover, there are also memorized the appropriate and respective instructions relative the sequence and pace, that is, the duration, of activation of such instructions.

Figure 3:
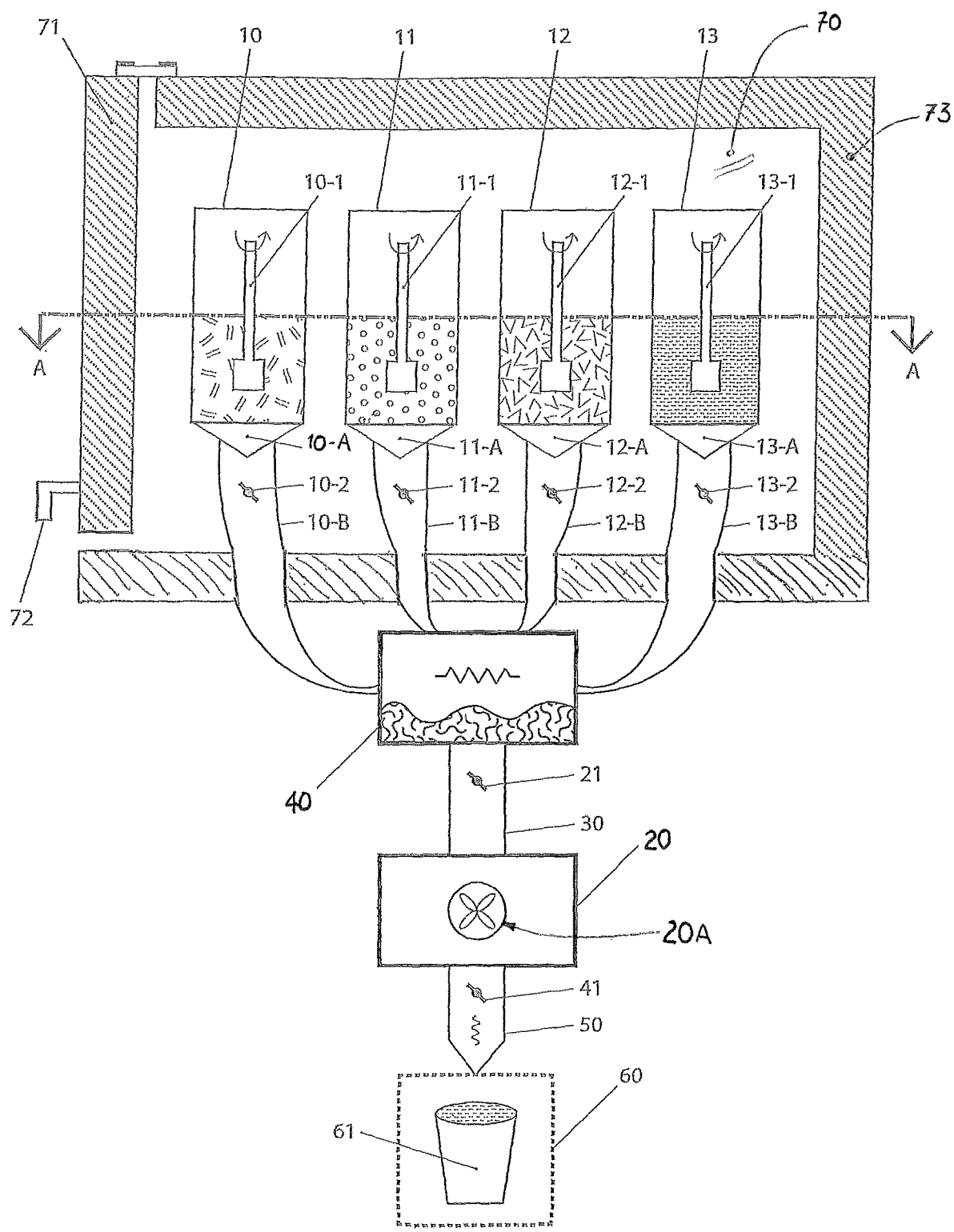
FIG. 3 is a schematic illustration of a variant embodiment of the apparatus of FIG. 1.

With reference to FIG. 3, an improved variant embodiment of the invention is shown; this variant differs from the embodiment described above in that in this second embodiment the positions of the mixer 20 and of the heating device 40 are inverted, so that now the heating device is placed before and not after the mixer 20.

The intended purpose of such form of embodiment is to completely liquefy the individual ingredients coming from the various containers 10, 11, 12 . . . before they are mixed with each other; in fact, since said ingredients can be completely or partly frozen, it could easily happen that their mixing with each other, while still frozen, could come about only partially or insufficiently.

The operation of the apparatus is as follows: the consumer enters through said control panel the information listed at the previous point I) and launches the operation of the apparatus through a normal instruction, in itself known; said internal command and control means process, on the basis of previously stored algorithms and parameters, a plurality of instructions/signals that are transmitted to respective said actuators and operating devices, with the sequence and pace foreseen for the specific type of request.

Finally, said actuators and operating devices perform their relative functions so that, in the end, the requested beverage is obtained and poured into said final container 61, cup or glass.

The invention claimed is:

1. Dispensing apparatus for dispensing and mixing cold beverages comprising:
   a pick-up compartment accessible from outside,
   a plurality of separate and distinct containers, each of them being able of containing a specific quantity of frozen product, and of selectively distributing a predetermined product amount into a mixing device, wherein at least a part of said plurality of containers is associated to a respective collecting device of a plurality of collecting devices able of mechanically collecting a predetermined quantity of the product and of transferring the product from selected containers of said plurality of containers into a path which comprises said mixing device and a liquefaction or de-freezing device,
   first conveying means able of conveying the products from said collecting devices to said mixing device,
   first valve arranged in said first conveying means,
   wherein said containers are internally provided with motion means able of mixing the products in the containers so as to avoid sticking or compactness of the products.

2. Apparatus according to claim 1, wherein each of said collecting devices comprises a hopper.

3. Apparatus according to claim 1, wherein a second valve is arranged in a second conveying means interposed between said mixing device and said liquefaction or de-freezing device.

4. Apparatus according to claim 1, wherein a third valve is arranged in a third conveying means arranged in a downstream position between the position of said liquefaction or de-freezing device and said mixing device, and which enters into said pick-up compartment.

5. Apparatus according to claim 1, wherein said containers are arranged inside a cooling cell whose temperature is selectively controllable.

6. Dispensing apparatus for dispensing and mixing cold beverages comprising:
   a pick-up compartment accessible from outside,
   a plurality of separate and distinct containers, each of them being able of containing a specific quantity of frozen product, and of selectively distributing a predetermined product amount into a mixing device, wherein at least a part of said plurality of containers is associated to a respective collecting device of a plurality of collecting devices able of mechanically collecting a predetermined quantity of the product and of transferring the product from selected containers of said plurality of containers into a path which comprises said mixing device and a liquefaction or de-freezing device,
   first conveying means able of conveying the products from said collecting devices to said mixing device,
   first valve arranged in said first conveying means, wherein a second valve is arranged in a second conveying means interposed between said mixing device and said liquefaction or de-freezing device.

7. Apparatus according to claim 6, wherein a third valve is arranged in a third conveying means arranged in a downstream position between the position of said liquefaction or de-freezing device and said mixing device, and which enters into said pick-up compartment.

8. Apparatus according to claim 7, wherein said containers are arranged inside a cooling cell whose temperature is selectively controllable.

9. Apparatus according to claim 6, wherein a third valve is arranged in a third conveying means arranged in a downstream position between the position of said liquefaction or de-freezing device and said mixing device, and which enters into said pick-up compartment.

10. Apparatus according to claim 6, wherein said containers are arranged inside a cooling cell whose temperature is selectively controllable.

11. Dispensing apparatus for dispensing and mixing cold beverages comprising:
    a pick-up compartment accessible from outside,
    a plurality of separate and distinct containers, each of them being able of containing a specific quantity of frozen product, and of selectively distributing a predetermined product amount into a mixing device, wherein at least a part of said plurality of containers is associated to a respective collecting device of a plurality of collecting devices able of mechanically collecting a predetermined quantity of the product and of transferring the product from selected containers of said plurality of containers into a path which comprises said mixing device and a liquefaction or de-freezing device,
    first conveying means able of conveying the products from said collecting devices to said mixing device,
    first valve arranged in said first conveying means, wherein said containers are arranged inside a cooling cell whose temperature is selectively controllable.

12. Apparatus according to claim 11, wherein said cooling cell is brought to a temperature lower than −6° C.

* * * * *